(12) United States Patent
Yin et al.

(10) Patent No.: US 12,533,507 B2
(45) Date of Patent: Jan. 27, 2026

(54) UPPER EXTREMITY WEARABLE DEVICE

(71) Applicant: TAIWAN TEXTILE RESEARCH INSTITUTE, New Taipei (TW)

(72) Inventors: Chieh Yin, New Taipei (TW); Chien-Lung Shen, New Taipei (TW); Szu-Yu Liao, New Taipei (TW); Mei-Chuan Tseng, New Taipei (TW); Chien-Fa Tang, New Taipei (TW)

(73) Assignee: TAIWAN TEXTILE RESEARCH INSTITUTE, New Taipei (TW)

( * ) Notice: Subject to any disclaimer, the term of this patent is extended or adjusted under 35 U.S.C. 154(b) by 415 days.

(21) Appl. No.: 18/165,955

(22) Filed: Feb. 8, 2023

(65) Prior Publication Data

US 2024/0066286 A1 Feb. 29, 2024

(30) Foreign Application Priority Data

Aug. 24, 2022 (TW) ................................. 111131857

(51) Int. Cl.
*A61N 1/00* (2006.01)
*A61N 1/04* (2006.01)

(52) U.S. Cl.
CPC ........... *A61N 1/0484* (2013.01); *A61N 1/048* (2013.01)

(58) Field of Classification Search
None
See application file for complete search history.

(56) References Cited

U.S. PATENT DOCUMENTS

| | | | | |
|---|---|---|---|---|
| 5,562,707 | A | * | 10/1996 | Prochazka .......... A61N 1/36003 607/2 |
| 6,567,706 | B2 | | 5/2003 | Bar-Or et al. |
| 7,162,305 | B2 | * | 1/2007 | Tong .................... A61N 1/0452 607/48 |
| 9,037,270 | B2 | | 5/2015 | Li et al. |
| 10,449,672 | B2 | * | 10/2019 | Assad ..................... A61B 5/486 |
| 2018/0154140 | A1 | * | 6/2018 | Bouton ................ A61B 5/4836 |

FOREIGN PATENT DOCUMENTS

| | | |
|---|---|---|
| CN | 1135722 A | 11/1996 |
| EP | 0948972 A2 | 10/1999 |
| TW | M505913 U | 8/2015 |
| TW | M505916 U | 8/2015 |

* cited by examiner

*Primary Examiner* — Niketa Patel
*Assistant Examiner* — Anant A Gupta
(74) *Attorney, Agent, or Firm* — McClure, Qualey & Rodack, LLP

(57) ABSTRACT

An upper extremity wearable device includes a pressure sleeve configure to wrap a forearm, a middle finger stimulating electrode and a ring finger stimulating electrode disposed on an inner surface of the pressure sleeve. The middle finger stimulating electrode covers a middle finger stimulating point which is measured from an ulnar styloid process, moving two lateral units, and moving four longitudinal units. The ring finger stimulating electrode covers a ring finger stimulating point which is measured from the ulnar styloid process, moving one lateral unit, and moving five longitudinal units. The lateral unit is a distance from the position of the pressure sleeve corresponding to the ulnar styloid process to a radial styloid process dividing four. The longitudinal unit is a distance from the position of the pressure sleeve corresponding to the ulnar styloid process to an olecranon process dividing twelve.

9 Claims, 8 Drawing Sheets

UPPER EXTREMITY WEARABLE DEVICE

RELATED APPLICATIONS

This application claims priority to Taiwanese Application Serial Number 111131857, filed Aug. 24, 2022, which is herein incorporated by reference.

BACKGROUND

Field of Invention

The present invention relates to an upper extremity wearable device.

Description of Related Art

Many disease patients and surgery patients have requirements of exercise rehabilitation therapy. The exercise rehabilitation therapy is preferably made within the golden rehabilitation period to achieve good performance. For example, functional electrical stimulation (FES) is an active rehabilitation type, which introduces current under skin to occur muscle contraction thereby increasing functional activities of extremities. The functional motion of extremity (e.g. grasping or walking) can be achieved thereby helping the patients doing active exercise. However, the patients are suffered from the complex processes of finding correct stimulation points and are unable to check the accuracy of the rehabilitation motion. Thus the rehabilitation situation in the golden period is not good.

SUMMARY

An aspect of the disclosure provides an upper extremity wearable device including a pressure sleeve configure to wrap a forearm, a middle finger stimulation electrode disposed on an inner surface of the pressure sleeve, and a ring finger stimulation electrode disposed on the inner surface of the pressure sleeve. The middle finger stimulation covers a middle finger stimulation point, and the position of the middle finger stimulation point is measured from a position of the pressure sleeve corresponding to an ulnar styloid process, moving two lateral units in a direction toward a radial styloid process and moving four longitudinal units in a direction toward an elbow. The ring finger stimulation electrode covers a ring finger stimulation point, and the position of the ring finger stimulation point is measured from the position of the pressure sleeve corresponding to the ulnar styloid process, moving one lateral unit in the direction toward the radial styloid process and moving five longitudinal units in the direction toward the elbow. The lateral unit is a distance from the position of the pressure sleeve corresponding to the ulnar styloid process to a position of the pressure sleeve corresponding to the radial styloid process dividing four, and the longitudinal unit is a distance from the position of the pressure sleeve corresponding to the ulnar styloid process to a position of the pressure sleeve corresponding to an olecranon process dividing twelve.

According to some embodiments, the upper extremity wearable device further includes a little finger stimulation electrode disposed on the inner surface of the pressure sleeve and covering a little finger stimulation point. The position of the little finger stimulation point is measured from the position of the pressure sleeve corresponding to the ulnar styloid process moving three longitudinal units in the direction toward the elbow.

According to some embodiments, the upper extremity wearable device further includes a thumb stimulation electrode disposed on the inner surface of the pressure sleeve and covering a thumb stimulation point. The position of the thumb stimulation point is measured from the position of the pressure sleeve corresponding to the ulnar styloid process, moving three lateral units in the direction toward the radial styloid process and moving three longitudinal units in the direction toward the elbow.

According to some embodiments, the upper extremity wearable device further includes an index finger stimulation electrode disposed on the inner surface of the pressure sleeve and covering an index finger stimulation point. The position of the index finger stimulation point is measured from the position of the pressure sleeve corresponding to the ulnar styloid process, moving one lateral unit in the direction toward the radial styloid process and moving three longitudinal units in the direction toward the elbow.

According to some embodiments, the thumb stimulation electrode, the index finger stimulation electrode, the middle finger stimulation electrode, the ring finger stimulation electrode, and the little finger stimulation electrode are fabric electrodes.

According to some embodiments, the upper extremity wearable device further includes a plurality of metal contacts disposed on an outer surface of the pressure sleeve and electrically connected to the thumb stimulation electrode, the index finger stimulation electrode, the middle finger stimulation electrode, the ring finger stimulation electrode, and the little finger stimulation electrode, respectively.

According to some embodiments, the upper extremity wearable device further includes a plurality of fabric wires disposed on the pressure sleeve. The fabric wires are configured to connect metal contacts to the thumb stimulation electrode, the index finger stimulation electrode, the middle finger stimulation electrode, the ring finger stimulation electrode, and the little finger stimulation electrode, respectively.

According to some embodiments, the upper extremity wearable device further includes a ground electrode disposed on the inner surface of the pressure sleeve, and an area of the ground electrode is greater than an area of the middle finger stimulation electrode.

According to some embodiments, the upper extremity wearable device further includes a metal contact disposed on an outer surface of the pressure sleeve and electrically connected to ground electrode.

According to some embodiments, the upper extremity wearable device further includes a fabric wire disposed on the pressure sleeve. The fabric wire is configured to connect metal contact to the ground electrode.

Accordingly, the present disclosure provides an upper extremity wearable device which arranges the stimulation electrodes corresponding to the effective stimulation points on the pressure sleeve. The upper extremity wearable device is adapted to general adults with various heights, weights, ages, genders. The complex processes of finding correct stimulation points executed by a professional person in the traditional rehabilitation can be skipped by using the upper extremity wearable device of the disclosure. The rehabilitation becomes daily work, and the efficiency of homecare rehabilitation can be improved.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE EMBODIMENTS

Figure 1:
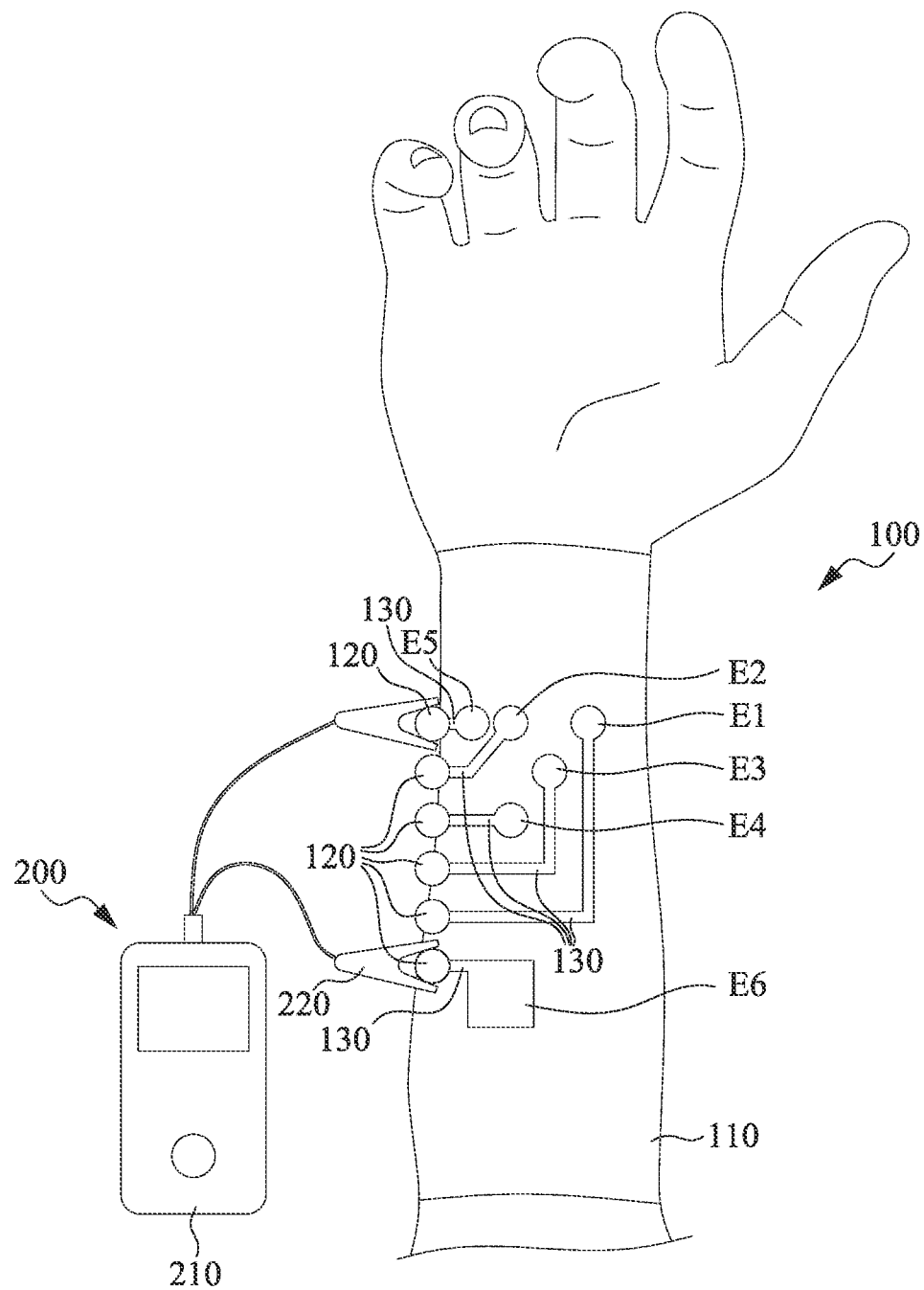
FIG. 1 is an operation schematic view of an upper extremity wearable device according to some embodiments of the disclosure.

Reference will now be made in detail to the present embodiments of the invention, examples of which are illustrated in the accompanying drawings. Wherever possible, the same reference numbers are used in the drawings and the description to refer to the same or like parts.

Reference is made to FIG. 1, which is an operation schematic view of an upper extremity wearable device according to some embodiments of the disclosure. The upper extremity wearable device 100 includes a pressure sleeve 110, a plurality of stimulation electrodes E1-E5 and a ground electrode E6 disposed on an inner surface of the pressure sleeve 110, a plurality of metal contacts 120 disposed on an outer surface of the pressure sleeve 110, and a plurality of fabric wires 130 connecting the stimulation electrodes E1-E5 and the ground electrode E6 to the metal contacts 120.

The upper extremity wearable device 100 is operated together with a controller 200, in which the controller 200 includes a host 210 and at least two clamps 220 electrically connected to the host 210. One of the clamps 220 is coupled to the metal contact 120 corresponding to the ground electrode E6, and the other clamp 220 is selectively coupled to the metal contact 120 corresponding to one of the stimulation electrodes E1-E5.

The upper extremity wearable device 100 is worn on a forearm of a wearer, and the position of the upper extremity wearable device 100 is adjusted to fit the profile of the forearm. Then the clamps 220 are respectively coupled to the metal contact 120 corresponding to the ground electrode E6 and the metal contact 120 corresponding to one of the stimulation electrodes E1-E5. An operator operates the host 210 to test and obtain a maximum tolerance stimulation current of the wearer, and an efficient stimulation current is determined at 80% of the maximum tolerance stimulation current of the wearer.

Then the operator operates the host 210 such that a current is provided to the one of the stimulation electrodes E1-E5 via the corresponding clamp 220, metal contact 120, and fabric wire 130. The current is transferred to stimulate the wearer, to further force the wearer executing a desire functional motion. For example, the desire functional motion can be the second knuckle of the index finger bending 90 degrees. This functional electrical stimulation is an active rehabilitation type, which introduces current under skin to occur muscle contraction thereby increasing rehabilitation efficiency of extremities of the wearer.

Comparing to other extremities, the individual variations of sizes and ratio of the forearms of adults are not obvious. Therefore, the pressure sleeve 110 with elasticity can be stretched along the forearm of the wearer after the pressure sleeve 110 is worn on the forearm of the wearer, and thus the pressure sleeve 110 can fit the forearm of the wearer. Namely, the upper extremity wearable device 100 provided in the disclosure is a general electronic stimulation device which can be adapted to adults of different ages and genders.

Figure 2A:
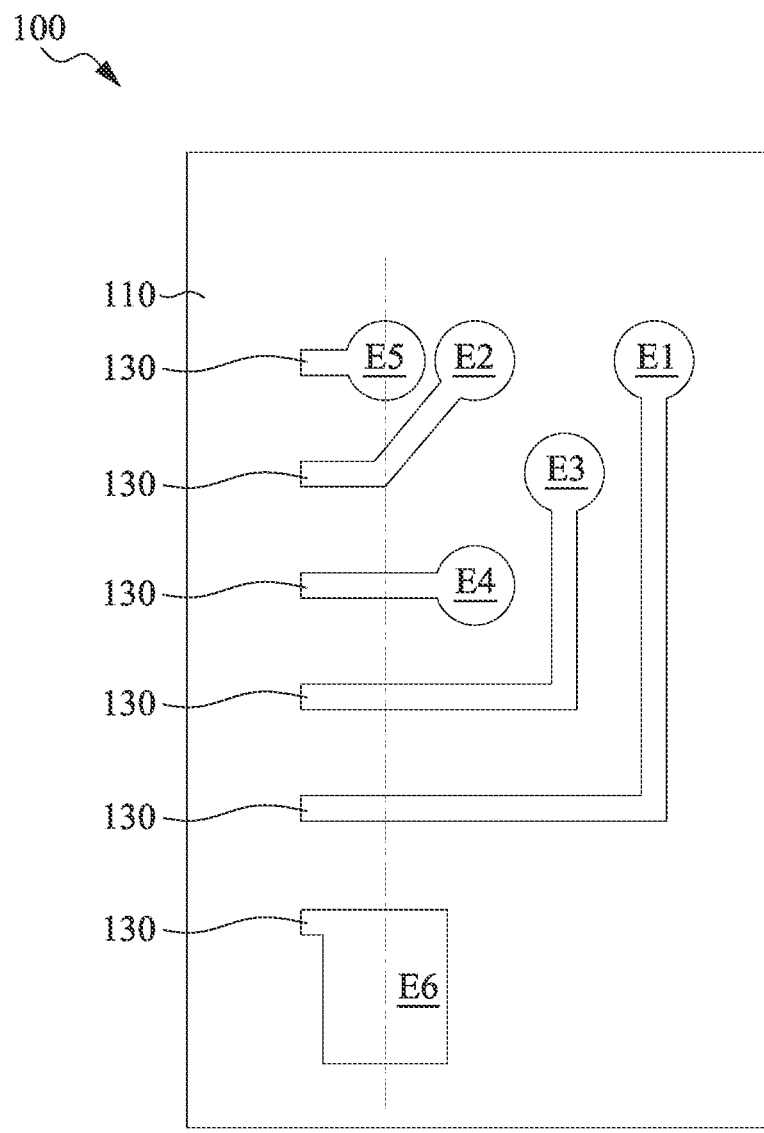
FIG. 2A and FIG. 2B are a front side view and a back side view of a fabric design of the upper extremity wearable device according to some embodiments of the disclosure, respectively.
Figure 2B:
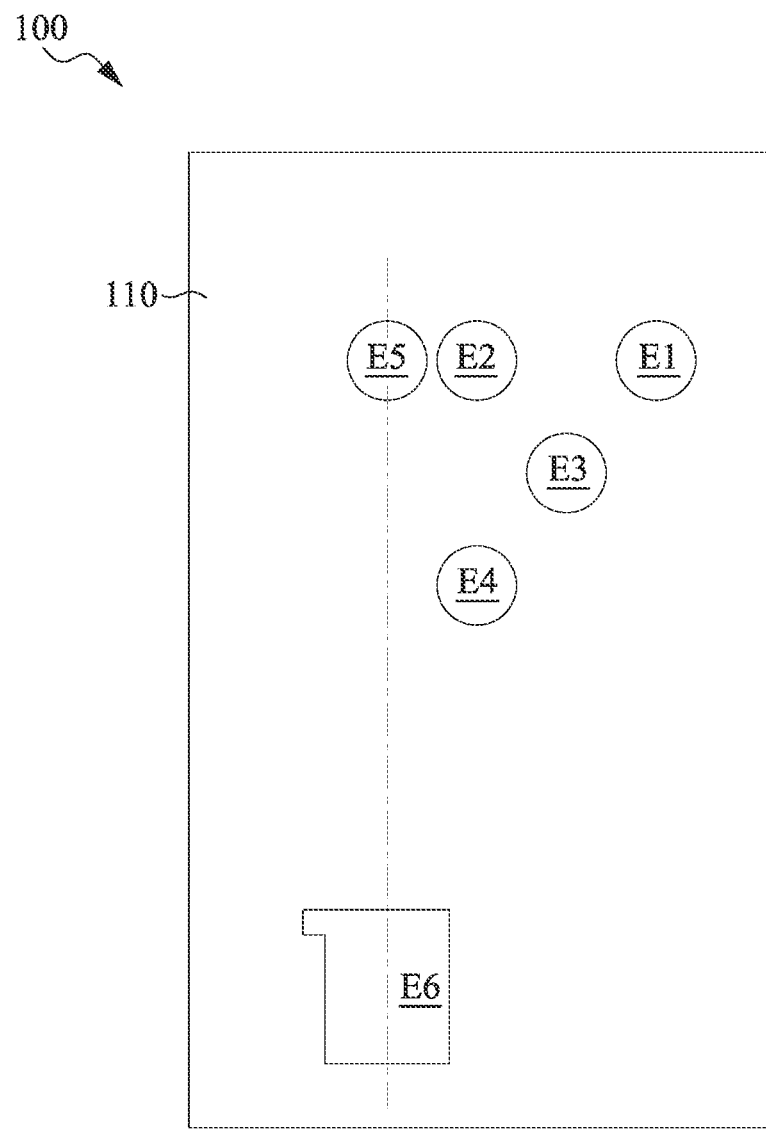

Reference is made to FIG. 2A and FIG. 2B, which are a front side view and a back side view of a fabric design of the upper extremity wearable device according to some embodiments of the disclosure, in which the back side of the upper extremity wearable device is the side contacting wearer's skin. In some embodiments, the stimulation electrodes E1-E5 and the ground electrode E6 are fabric electrodes having elasticities. By properly designing the weaving of the fabric, the pressure sleeve 110, the stimulation electrodes E1-E5, the ground electrode E6, and the fabric wires 130 can be integrately formed in a single piece.

Because the pressure sleeve 110, the stimulation electrodes E1-E5, the ground electrode E6, and the fabric wires 130 can be integrately formed in a single piece, the upper extremity wearable device 100 can survive from a washing test and is not easily deformed.

In some embodiments, the an end of each of the fabric wires 130 is connected to the corresponding stimulation electrodes E1-E5 or the ground electrode E6, and another end of each of the fabric wires 130 is collected to same side of the pressure sleeve 110. Such design is benefit to the following coupling to the metal contacts 120 (as shown in FIG. 1) and the following operations. In some embodiments, the size of the ground electrode E6 is greater than a size of any one of the stimulation electrodes E1-E5.

As discussed previously, the individual variations of sizes and ratio of the forearms of adults are not obvious, thus the positions of the stimulation electrodes E1-E5 on the pressure sleeve 110 can be decided by collecting and analyzing date from many testers.

Figure 3A:
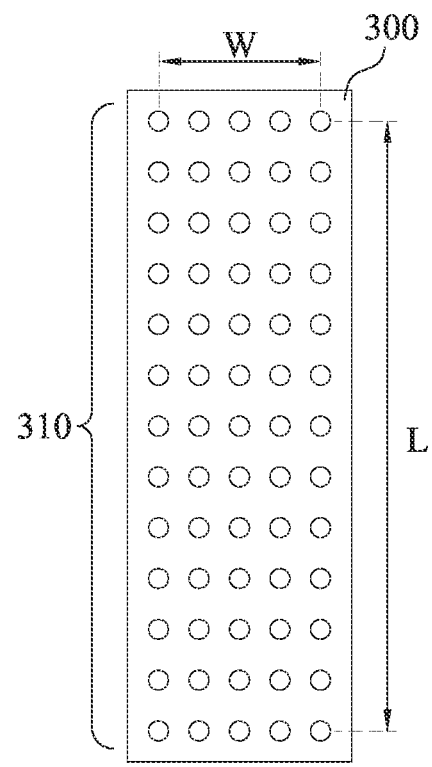
FIG. 3A to FIG. 3C are schematic flows of establishing a standard motion model of the upper extremity wearable device according to some embodiments of the disclosure.
Figure 3B:
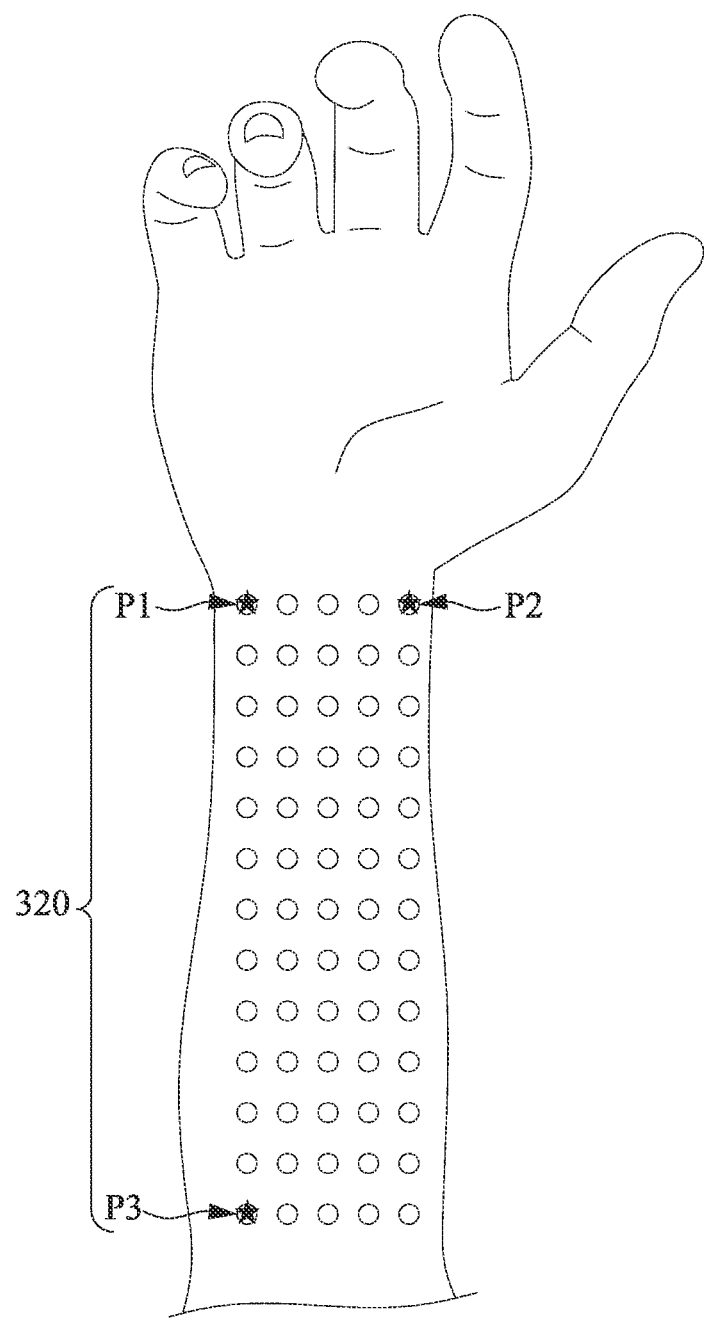
Figure 3C:
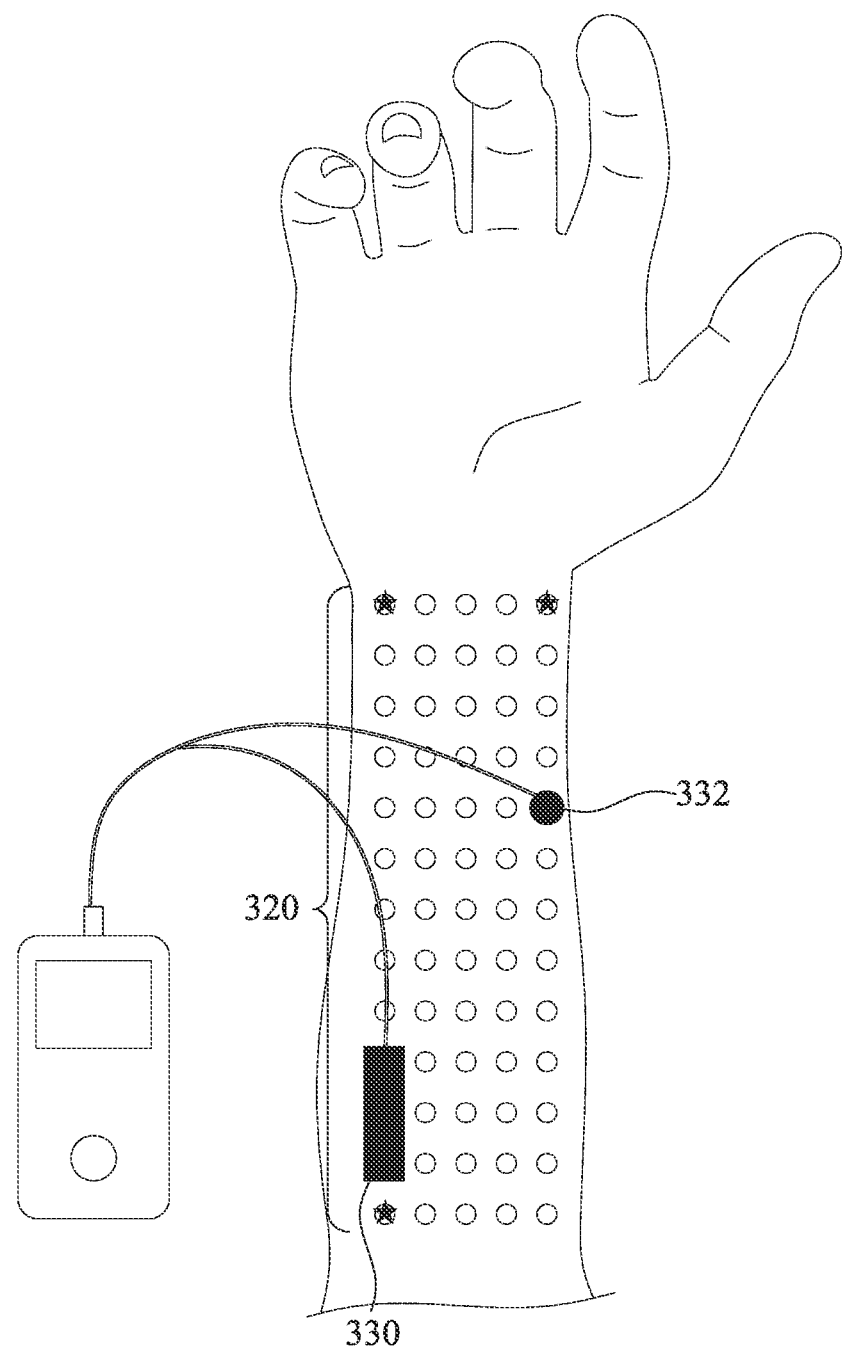

For example, as shown in FIG. 3A to FIG. 3C, FIG. 3A to FIG. 3C are schematic flows of establishing a standard motion model of the upper extremity wearable device according to some embodiments of the disclosure. First, a hole array 310 is formed on a plastic board 300, in which the hole array 310 is utilized for positioning. The size of the plastic board 300 represents a tester's forearm size. More particularly, at the right hand of the tester, the holes at upmost two corners respectively correspond to the position of an ulnar styloid process and the position of a radial styloid process of the tester, and the left bottom hole of the hole array 310 of the plastic board 300 corresponds to the position of an olecranon process of the tester. The position of the left bottom hole of the hole array 310 of the plastic board 300 is determined by a rectangle including the three corners mentioned above.

The positions of the rest of the holes are determined by dividing a lateral width W and a longitudinal length L of the rectangle including the four corners. The hole array 310 is formed by drilling the plastic board 300. For example, the hole array 310 of this embodiment is a 5×13 array, and the positions of the holes of the hole array 310 are decided by the lateral width W from a position of the tester's ulnar styloid process (e.g. the ulnar styloid process P1 in FIG. 3B) to a position of the tester's radial styloid process (e.g. the radial styloid P2 in FIG. 3B) dividing four and the longitudinal length L from a position of the tester's ulnar styloid process (e.g. the ulnar styloid process P1 in FIG. 3B) to a position of the tester's olecranon process (e.g. the olecranon process P3 in FIG. 3B) dividing twelve.

Then, as shown in FIG. 3B, the plastic board 300 of FIG. 3A is placed on the tester's forearm, and a plurality of dots are marked on the tester's right forearm by a marker pen or other suitable method, through the holes of the hole array 310, thereby forming a coordinate array 320 on the tester's right forearm. While placing the plastic board 300, the holes at upper two corners align the ulnar styloid process P1 and the radial styloid P2 of the tester, and the hole at left bottom corner aligns the olecranon process P3 of the tester. The lateral distance between adjacent two dots of the coordinate array 320 is a distance between the ulnar styloid process P1 and the radial styloid P2 of the tester dividing four, and a longitudinal distance between adjacent two dots of the coordinate array 320 is a distance between the ulnar styloid process P1 and olecranon process P3 of the tester dividing twelve.

As shown in FIG. 3C, a ground electrode patch 330 is adhered on the tester's right forearm, and a stimulation electrode patch 332 is sequentially adhered on the dots of the coordinate array 320 for electrical stimulation. When the electrical stimulation applied to the dot is strong enough to force the second knuckle of the finger bending 90 degrees, this dot is regarded as an effective electrical stimulation point, and the position of this dot is recorded.

By repeating several times of aforementioned operations, data of different testers with various heights, weights, ages, genders can be collected, and the intersect of the coordinate of the effective electrical stimulation points of different testers is obtained. Once the high commonality of the effective electrical stimulation points of different testers is checked, the standard motion model is established. After the standard motion model is established, a sample of the upper extremity wearable device is fabricated according to the effective electrical stimulation points of standard motion model. The sample of the upper extremity wearable device is further worn on a new batch of different testers with various heights, weights, ages, genders, and electrical stimulation tests are performed to the new batch of testers.

Based on the electrical stimulation test result, the accuracy of the index finger point is 0.54 because the index finger nervous is a deep nervous, the accuracy of the middle finger point and the accuracy of the ring finger point are 0.87, and the accuracy of the thumb point and the accuracy of the little finger point are 0.74. That means the effective electrical stimulation points of the established standard motion model are common to general adults.

Figure 4A:
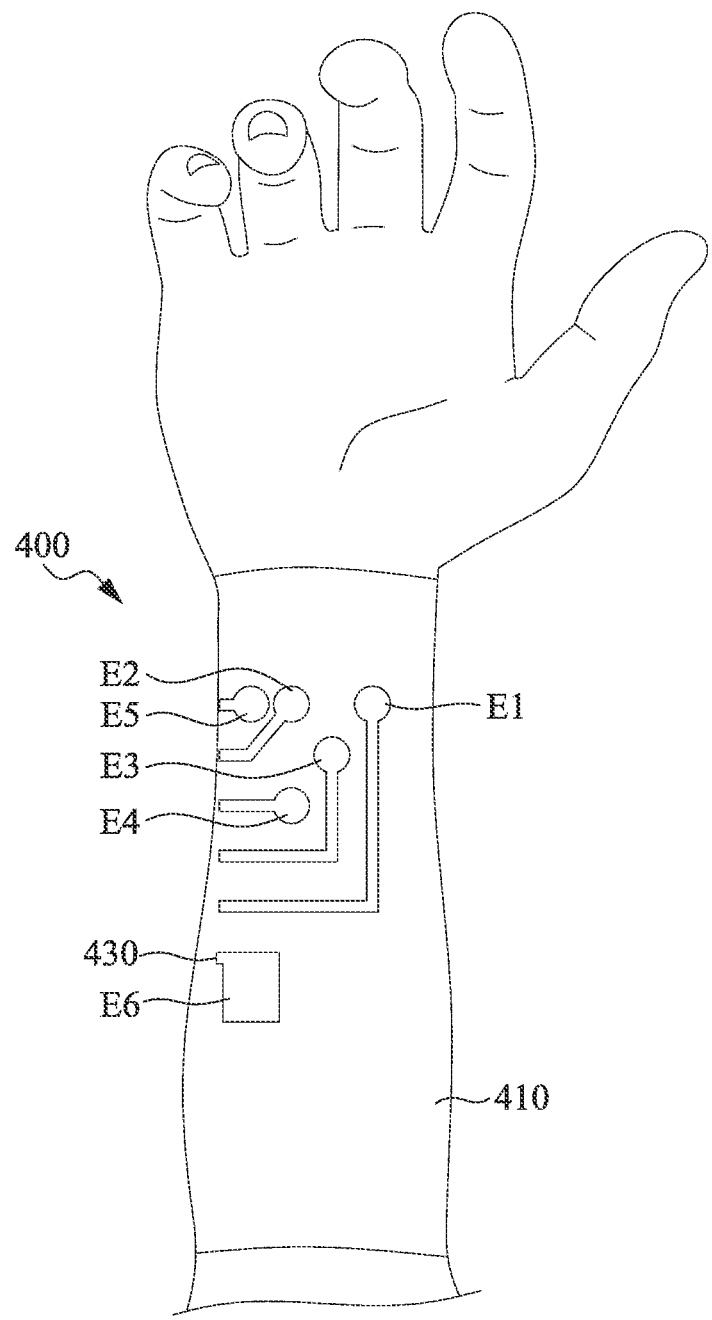
FIG. 4A is a schematic view of the upper extremity wearable device on the tester according to some embodiments of the disclosure.
Figure 4B:
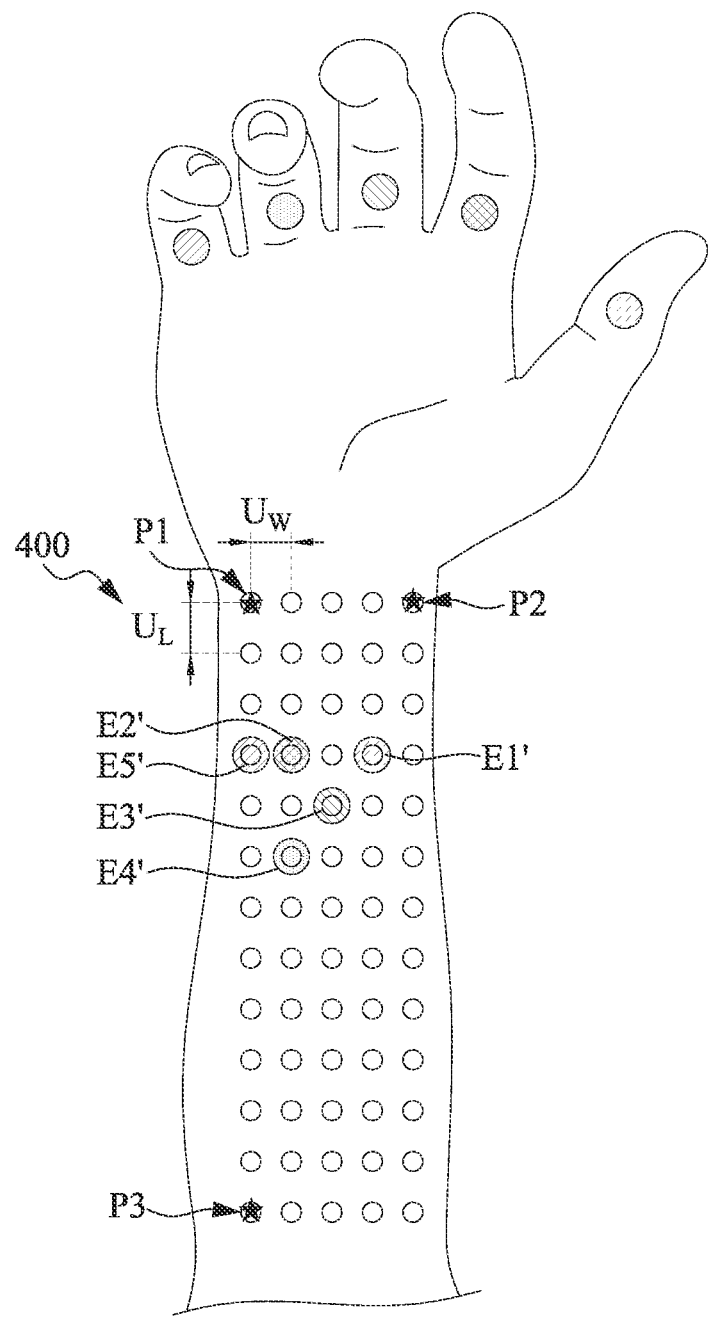
FIG. 4B is a schematic view of the distribution of the stimulation electrodes corresponding to the tester's forearm according to some embodiments of the disclosure.

Reference is made to FIG. 4A and FIG. 4B. FIG. 4A is a schematic view of the upper extremity wearable device on the tester according to some embodiments of the disclosure. FIG. 4B is a schematic view of the distribution of the stimulation electrodes corresponding to the tester's forearm according to some embodiments of the disclosure. It is noted that only the pressure sleeve 410, the stimulation electrodes E1-E5, the ground electrode E6, and the fabric wires 430 of the upper extremity wearable device 400 are illustrated in FIG. 4A for simplifying the drawing. After the upper extremity wearable device 400 is worn on the wearer's forearm, the position of the pressure sleeve 410 is adjusted such that the upper edge of the pressure sleeve 410 aligns the ulnar styloid process P1 and the radial styloid P2 of the wearer. Then the pressure sleeve 410 is naturally stretched and deformed along the wearer's forearm. Because of the elasticity of the pressure sleeve 410, the pressure sleeve 410 fits the wearer's forearm, and the stimulation electrodes E1-E5 are arranged on the positions corresponding effective electrical stimulation points.

More particularly, the stimulation electrodes E1-E5 includes a thumb stimulation electrode E1, an index finger stimulation electrode E2, a middle finger stimulation electrode E3, a ring finger stimulation electrode E4, and a little finger stimulation electrode E5. The thumb stimulation electrode E1 is disposed on the inner surface of the pressure sleeve 410 and covering a thumb stimulation point E1'. The position of the thumb stimulation point E1' is measured from the position of the pressure sleeve 410 corresponding to the ulnar styloid process P1, moving three lateral units UW in the direction toward the radial styloid process P2 and moving three longitudinal units UL in the direction toward the elbow.

The index finger stimulation electrode E2 is disposed on the inner surface of the pressure sleeve 410 and covering an index finger stimulation point E2'. The position of the index finger stimulation point E2' is measured from the position of the pressure sleeve 410 corresponding to the ulnar styloid process P1, moving one lateral unit UW in the direction toward the radial styloid process P2 and moving three longitudinal units UL in the direction toward the elbow.

The middle finger stimulation electrode E3 is disposed on the inner surface of the pressure sleeve 410 and covering a middle finger stimulation point E3'. The position of the middle finger stimulation point E3' is measured from the position of the pressure sleeve 410 corresponding to the ulnar styloid process P1, moving two lateral units UW in the direction toward the radial styloid process P2 and moving four longitudinal units UL in the direction toward the elbow.

The ring finger stimulation electrode E4 is disposed on the inner surface of the pressure sleeve 410 and covering a ring finger stimulation point E4'. The position of the ring finger stimulation point E4' is measured from the position of the pressure sleeve 410 corresponding to the ulnar styloid process P1, moving one lateral unit UW in the direction toward the radial styloid process P2 and moving five longitudinal units UL in the direction toward the elbow.

The little finger stimulation electrode E5 is disposed on the inner surface of the pressure sleeve 410 and covering a little finger stimulation point E5'. The position of the little finger stimulation point E5' is measured from the position of the pressure sleeve 410 corresponding to the ulnar styloid process P1 moving three longitudinal units UL in the direction toward the elbow.

The positions of the thumb stimulation point E1', the index finger stimulation point E2', the middle finger stimulation point E3', the ring finger stimulation point E4', and the little finger stimulation point E5' are set to allow the second knuckle of the finger counted from the palm bending 90 degrees after being electrical stimulated.

As discussed above, the pressure sleeve 410 is naturally stretched and deformed along the wearer's forearm, therefore the distances between adjacent points of the pressure sleeve 410 is varied in a manner same as the deformation of the pressure sleeve 410. Referring to the sampling method described in FIG. 3A to FIG. 3C, the lateral unit UW is a distance from the position of the pressure sleeve 410 corresponding to the ulnar styloid process P1 to the position of the pressure sleeve 410 corresponding to the radial styloid process P2 dividing four, and the longitudinal unit UL is a distance from the position of the pressure sleeve 410 corresponding to the ulnar styloid process P1 to the position of the pressure sleeve 410 corresponding to the olecranon process P3 dividing twelve.

Accordingly, the present disclosure provides an upper extremity wearable device which arranges the stimulation electrodes corresponding to the effective stimulation points on the pressure sleeve. The upper extremity wearable device is adapted to general adults with various heights, weights, ages, genders. The complex processes of finding correct stimulation points executed by a professional person in the traditional rehabilitation can be skipped by using the upper extremity wearable device of the disclosure. The rehabilitation becomes daily work, and the efficiency of homecare rehabilitation can be improved.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An upper extremity wearable device comprising:
a pressure sleeve configure to wrap a forearm;
a middle finger stimulation electrode disposed on an inner surface of the pressure sleeve and configured to cover a middle finger stimulation point,
a ring finger stimulation electrode disposed on the inner surface of the pressure sleeve and configured to cover a ring finger stimulation point; and
a ground electrode disposed on the inner surface of the pressure sleeve, wherein an area of the ground electrode is greater than an area of the middle finger stimulation electrode,
wherein positions of the middle finger stimulation electrode and the ring finger stimulation electrode are positioned via a 5×13 array, wherein a lateral distance of the 5×13 array from a position of the pressure sleeve corresponding to an ulnar styloid process to a position of the pressure sleeve corresponding to a radial styloid process is divided four as four lateral units, and a longitudinal distance of the 5×13 array from the position of the pressure sleeve corresponding to the ulnar styloid process to a position of the pressure sleeve corresponding to an olecranon process is divided twelve as twelve longitudinal units,
wherein the position of the middle finger stimulation point is measured from the position of the pressure sleeve corresponding to the ulnar styloid process, moving two lateral units in a direction toward the radial styloid process and moving four longitudinal units in a direction toward an elbow,
wherein the position of the ring finger stimulation point is measured from the position of the pressure sleeve corresponding to the ulnar styloid process, moving one lateral unit in the direction toward the radial styloid process and moving five longitudinal units in the direction toward the elbow.

2. The upper extremity wearable device of claim 1, further comprising a little finger stimulation electrode disposed on the inner surface of the pressure sleeve and configured to cover a little finger stimulation point, wherein a position of the little finger stimulation point is measured from the position of the pressure sleeve corresponding to the ulnar styloid process moving three longitudinal units in the direction toward the elbow.

3. The upper extremity wearable device of claim 2, further comprising a thumb stimulation electrode disposed on the inner surface of the pressure sleeve and configured to cover a thumb stimulation point, wherein a position of the thumb stimulation point is measured from the position of the pressure sleeve corresponding to the ulnar styloid process, moving three lateral units in the direction toward the radial styloid process and moving three longitudinal units in the direction toward the elbow.

4. The upper extremity wearable device of claim 3, further comprising an index finger stimulation electrode disposed on the inner surface of the pressure sleeve and configured to cover an index finger stimulation point, wherein a position of the index finger stimulation point is measured from the position of the pressure sleeve corresponding to the ulnar styloid process, moving one lateral unit in the direction toward the radial styloid process and moving three longitudinal units in the direction toward the elbow.

5. The upper extremity wearable device of claim 4, wherein the thumb stimulation electrode, the index finger stimulation electrode, the middle finger stimulation electrode, the ring finger stimulation electrode, and the little finger stimulation electrode are fabric electrodes.

6. The upper extremity wearable device of claim 4, further comprising a plurality of metal contacts disposed on an outer surface of the pressure sleeve and electrically connected to the thumb stimulation electrode, the index finger stimulation electrode, the middle finger stimulation electrode, the ring finger stimulation electrode, and the little finger stimulation electrode, respectively.

7. The upper extremity wearable device of claim 6, further comprising a plurality of fabric wires disposed on the pressure sleeve, wherein the fabric wires are configured to connect metal contacts to the thumb stimulation electrode, the index finger stimulation electrode, the middle finger stimulation electrode, the ring finger stimulation electrode, and the little finger stimulation electrode, respectively.

8. The upper extremity wearable device of claim 1, further comprising a metal contact disposed on an outer surface of the pressure sleeve and electrically connected to ground electrode.

9. The upper extremity wearable device of claim 8, further comprising a fabric wire disposed on the pressure sleeve, wherein the fabric wire is configured to connect metal contact to the ground electrode.

* * * * *